(12) United States Patent
Gladnick et al.

(10) Patent No.: US 7,508,529 B2
(45) Date of Patent: Mar. 24, 2009

(54) MULTI-RANGE NON-CONTACT PROBE

(75) Inventors: Paul Gladnick, Seattle, WA (US); Scott Harsila, Bothell, WA (US)

(73) Assignee: Mitutoyo Corporation, Kawasaki-shi (JP)

( * ) Notice: Subject to any disclaimer, the term of this patent is extended or adjusted under 35 U.S.C. 154(b) by 367 days.

(21) Appl. No.: 11/497,466

(22) Filed: Jul. 31, 2006

(65) Prior Publication Data

US 2008/0024753 A1    Jan. 31, 2008

(51) Int. Cl.
*G01B 11/24* (2006.01)
*G01B 11/30* (2006.01)

(52) U.S. Cl. ............... 356/603; 356/602; 382/141; 382/152

(58) Field of Classification Search .......... 356/600, 356/602, 603, 614, 622, 625, 633, 639; 382/141, 382/152; 33/547
See application file for complete search history.

(56) References Cited

U.S. PATENT DOCUMENTS

| | | | |
|---|---|---|---|
| 4,191,969 A | 3/1980 | Briand et al. | |
| 4,380,027 A | 4/1983 | Leventer et al. | |
| 4,453,082 A | 6/1984 | Pryor | |
| 4,539,595 A | 9/1985 | Warner | |
| 4,631,586 A | 12/1986 | Gennetten et al. | |
| 4,908,951 A * | 3/1990 | Gurny | 33/503 |
| 4,919,535 A * | 4/1990 | Hohberg et al. | 356/429 |
| 5,125,035 A | 6/1992 | McCarthy et al. | |
| 5,175,601 A * | 12/1992 | Fitts | 356/604 |
| 5,214,857 A | 6/1993 | McMurtry et al. | |
| RE35,409 E | 12/1996 | Moore | |
| 5,615,489 A | 4/1997 | Breyer et al. | |
| 5,825,666 A | 10/1998 | Freifeld | |
| 6,064,440 A | 5/2000 | Born et al. | |
| 6,081,381 A | 6/2000 | Shalapenok et al. | |
| 6,493,361 B1 | 12/2002 | Yamaguchi et al. | |
| 6,573,931 B1 | 6/2003 | Horii et al. | |
| 6,591,060 B1 | 7/2003 | Buckley et al. | |
| 6,643,024 B2 | 11/2003 | Deck et al. | |
| 6,798,928 B2 | 9/2004 | Iida et al. | |

(Continued)

OTHER PUBLICATIONS

*Renishaw Machine Checking Gauge User's Guide*, H-1000-5080-03-A, Renishaw PLC, © 2002.
U.S. Appl. No. 11/494,972, filed Jul. 28, 2006, Gladnick.

*Primary Examiner*—Tarifur Chowdhury
*Assistant Examiner*—Michael LaPage
(74) *Attorney, Agent, or Firm*—Christensen O'Connor Johnson Kindness PLLC (57) ABSTRACT

A multi-range non-contact probe is provided which performs approximate range-finding measurement functions in addition to more precise structured light measurement functions. The probe is compatible with a probe control interface which allows advanced measuring capabilities and functions to be used with a probe head system that provides a limited number of wired connections. A laser beam of the probe is directed along a first optical path during a first period for providing structured light measurement functions and is directed along a second optical path for a second time period range finding functions. A single beam modification element having at least first and second portions with different types of optical characteristics is moved to output the laser beam from the first portion along the first optical path and then to output the laser beam from the second portion along the second optical path.

20 Claims, 5 Drawing Sheets

U.S. PATENT DOCUMENTS

| | | |
|---|---|---|
| 6,948,255 B2 | 9/2005 | Russell |
| 6,951,060 B2 | 10/2005 | Groell |
| 7,039,550 B2 | 5/2006 | Noda |
| 2005/0207160 A1 | 9/2005 | Babayoff et al. |

* cited by examiner

MULTI-RANGE NON-CONTACT PROBE

FIELD OF THE INVENTION

The invention relates generally to precision measurement instruments, and more particularly to a multi-range non-contact probe that is used in a coordinate measuring machine.

BACKGROUND OF THE INVENTION

In one type of coordinate measuring machine, the surface of a workpiece is scanned with a probe. After the scan, a three dimensional profile of the workpiece is provided. In one type of scanning probe, the workpiece is directly measured by touching a mechanical contact of the probe head to various points along the workpiece surface. In some cases, the mechanical contact is a ball.

In other coordinate measuring machines, a "non-contact" optical probe is utilized which measures the workpiece without making physical contact with the surface. Certain optical probes utilize light points (such as triangulation probes), and other so-called video probes comprise video cameras which detect a greater portion of the workpiece surface. In some systems, the coordinates of the geometric elements of the workpiece are determined via image processing software.

Such probes are often designed to obtain precise measurements of workpiece surfaces (e.g. certain exemplary probes may even provide measurements that are accurate in the micron range.) In some of these probes, the depth of focus or depth of field (DOF) of the measurement optics is relatively limited. In other words, the probe is designed to work well when it is positioned within a relatively small range relative to the surface of the workpiece, but once it is out of this range (either too near or too far) the optics will be out of focus and it is difficult to discern the position of a surface relative to the probe. In some instances the probe may accidentally be "crashed" into the workpiece surface as it is moved closer while no warning is provided with regard to the proximity of the probe to the surface.

Another difficulty with non-contact probes is that measuring probes are frequently interchangeably attached to coordinate measuring machines by various "probe heads". At present, Renishaw™ probes heads are the most commonly used for certain applications in the industry. These probes heads are manufactured by Renishaw Metrology Limited in Gloucestershire, United Kingdom. While Renishaw type probe head systems are the most commonly used in the industry, certain machine vision type technologies are not easily incorporated into Renishaw type systems. One particular issue with regard to using Renishaw type probe head systems, is that the existing connections between the machines and the probes contain a limited number of wired connections, which essentially forms a "bottleneck" which makes it difficult to add additional technologies and/or features to a compatible probe, due to the lack of physical wires for carrying a desirable number of control and data signals.

The present invention is directed to providing an apparatus that overcomes the foregoing and other disadvantages.

SUMMARY OF THE INVENTION

More specifically, a multi-range non-contact probe is provided which allows the coordinate measuring machine to perform certain "range-finding" functions in addition to its more precise structured light measurement functions. In addition, the multi-range non-contact probe is of a particularly simple and compact design that is compatible with a non-contact probe control interface which allows more advanced measuring capabilities and functions to be used with an existing probe head system (e.g. a Renishaw type system), or a probe head system that provides a limited number of wired connections. The multi-range non-contact probe may thus be automatically interchanged with other types of measuring probes used in existing probe head systems.

In accordance with one aspect of the invention, in order to perform certain "range-finding" functions, a laser beam that is directed along a first optical path for providing structured light measurement functions is also directed along a second optical path for a selected time period in order to provide a triangulation reference for determining an approximate distance to a workpiece surface. A single beam modification element having at least two portions with different types of optical characteristics may be used for directing the laser beam along the first and second optical paths.

In accordance with another aspect of the invention, in one embodiment the beam is a laser beam which is directed along the first path for the structured light functions during a first time period. More specifically, in one embodiment during the first time period the laser beam is directed through a diffuser portion of a rotating beam modification element so as to produce relatively diffuse illumination along a first beam path. The relatively diffuse illumination is then patterned by a spatial light modulator and continues on to project a structured light pattern to a structured light image range. Then, during a second time period, the rotating beam modification element rotates to bring a deflector portion into the laser beam path, which causes the deflected laser beam to continue on as relatively concentrated illumination along a second beam path to a range finding image range. In this configuration, during the first time period a camera is operable to image the structured light pattern on a workpiece surface to surface measurement data within a first distance range relative to the probe. Then, during the second time period the camera is operable to image the relatively concentrated illumination on a workpiece surface to provide surface measurement data within a second distance range, and thus provide a type of "range-finding" function which may be used to determine an approximate distance to the surface of a workpiece over a range that extends significantly beyond the structured light image range.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
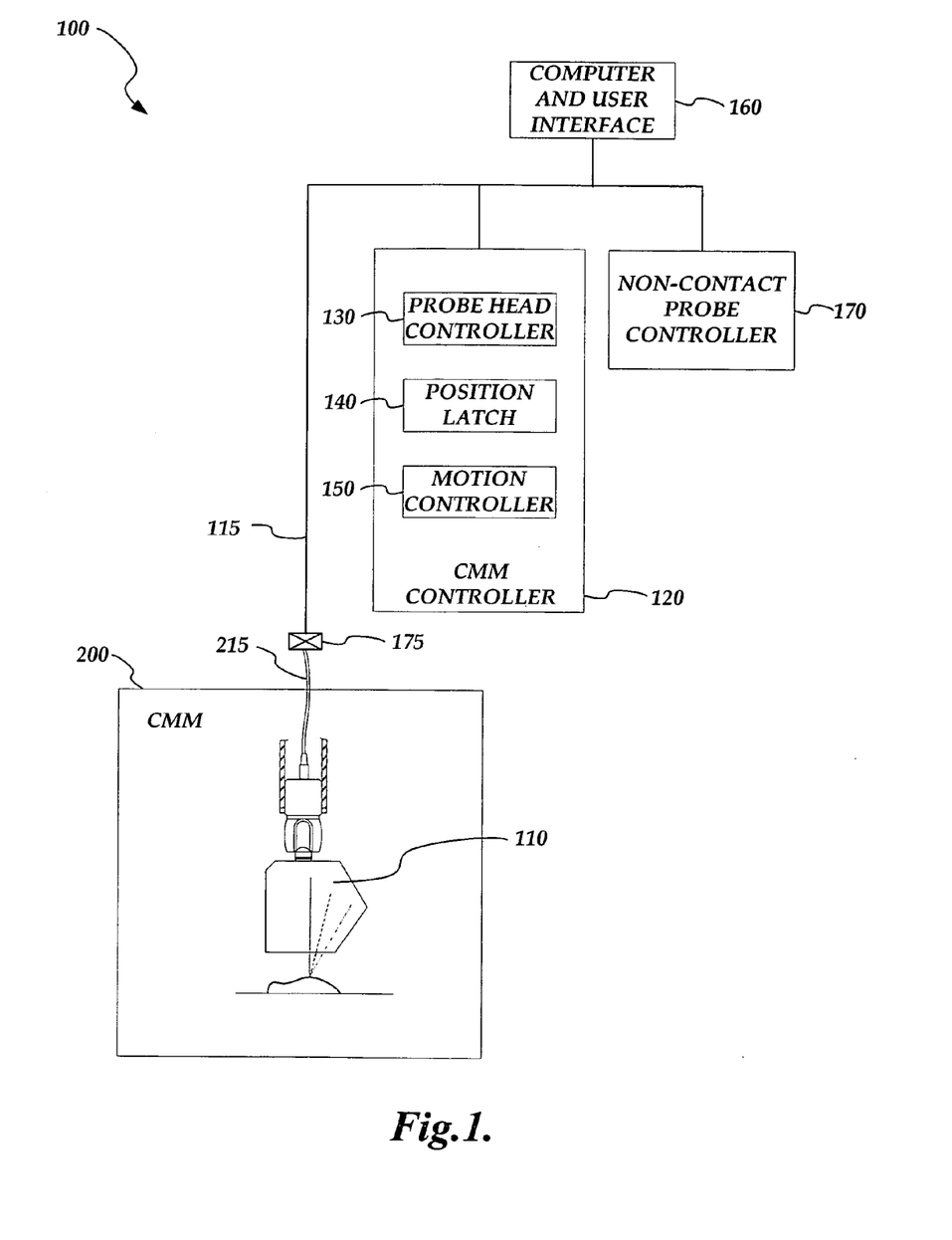
FIG. 1 is a block diagram of a coordinate measurement system with a coordinate measurement machine, a probe, controllers and a user interface.

FIG. 1 is a diagram of a coordinate measurement system 100. The coordinate measurement system 100 includes a coordinate measurement machine controller 120, a computer and user interface 160, a probe controller 170 and a coordinate measurement machine 200. The controller 120 includes a probe head controller 130, a position latch 140 and a motion controller 150. The coordinate measurement machine 200 includes a non-contact structured light probe 110.

The coordinate measurement machine 200 communicates with all of the other components through a data transfer line 115 (e.g. a bus), which is connected by a connector 175 (e.g. a "micro-D" type connector) to a probe head cable 215 which provides signals to and from the non-contact structured light probe 110. The coordinate measurement machine 200 is controlled by the coordinate measurement machine controller 120, while the non-contact structured light probe 110 is controlled by the probe controller 170. The user may control all of the components through the computer and user interface 160.

Figure 2:
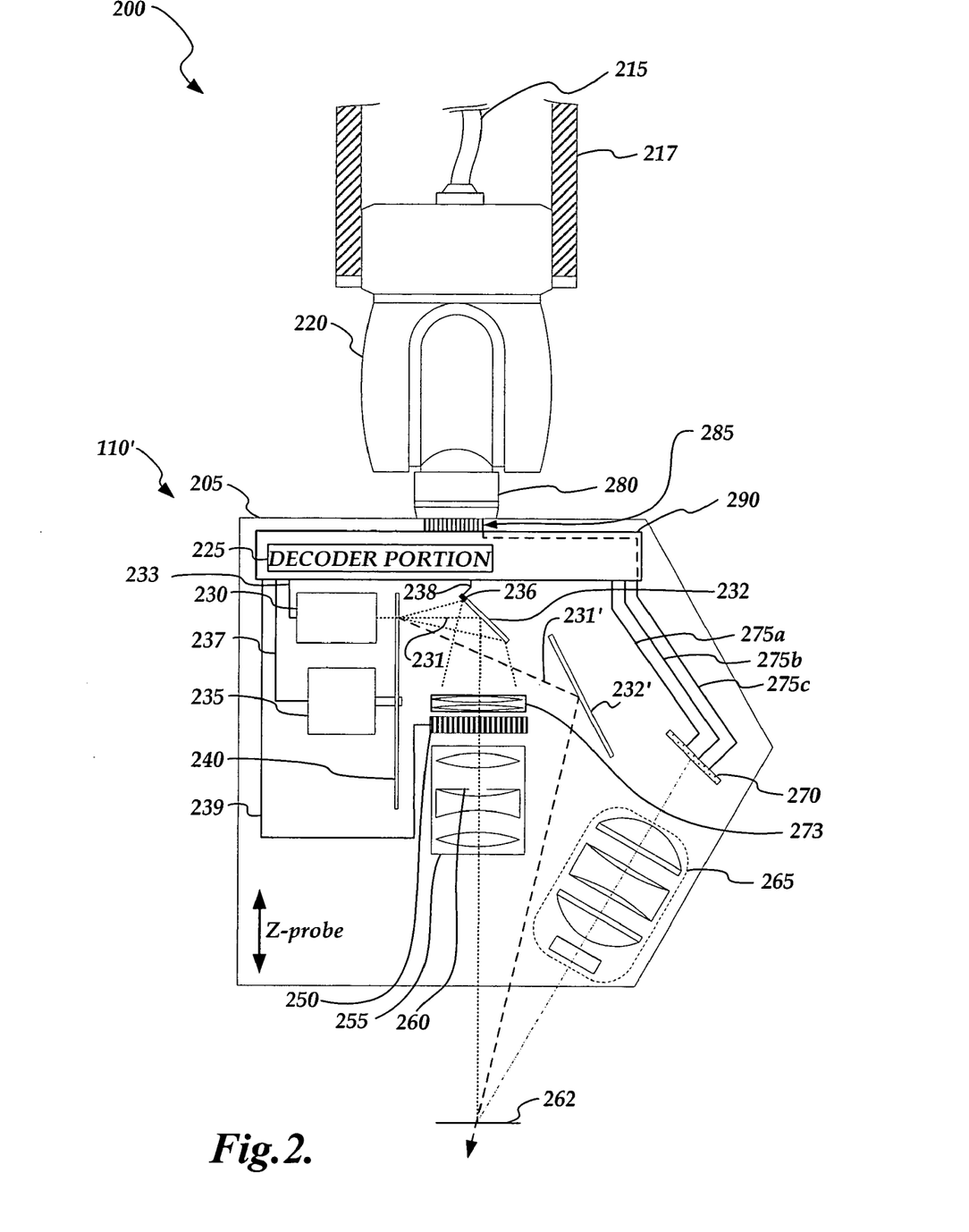
FIG. 2 is a diagram illustrating the internal components of a first exemplary embodiment of a multi-range structured light probe according to this invention;.

FIG. 2 is a diagram illustrating the internal components of a first exemplary embodiment of a multi-range structured light probe 110' according to this invention, which is one embodiment the probe 110 of FIG. 1. The probe 110' includes a probe housing 205, a laser 230, mirrors 232 and 232', a beam modification element motor 235, a first embodiment of a rotating beam modification element 240 according to this invention, a spatial light modulator 250, projection optics 255, camera optics 265, a camera 270, illumination optics 273, and probe control interface electronics 290. The probe head 220 receives and transmits probe signals through the probe head cable 215. The probe head 220 is secured to a coordinate measurement machine quill 217. The probe head 220 is connected to the probe 110' by a probe autojoint connection 280. The probe head 220 in some embodiments rotates in 360 degrees in a horizontal plane and contains a type of U-joint. The probe autojoint connection 280 is an electromechanical connection that fastens the probe head 220 rigidly and mechanically to the structured light probe 110', in a way such that it can be disconnected from one probe and attached to another.

The structured light probe 110' receives its control signals through the autojoint connection 280. The signals passed to the structured light probe 110' through the autojoint connection 280 are passed through connection lines 285 to the probe control interface electronics 290. The probe control interface electronics 290 include a decoder portion 225 which uses known circuit and/or software technologies for providing signal processing operations which are described in more detail below. The probe control interface electronics 290 send and receive signals through various signal lines, including a laser power and control line 233, a beam modification element motor power and control line 237, a photodetector power and signal line 238, a spatial light modulator power and control line 239, a camera trigger and control line 275a, a camera power line 275b and an analog video out line 275c. The laser power and control line 233 may in some embodiments be a minibus that provides control and a power line for the laser 230. The laser 230 is in one embodiment a solid state laser. In one example embodiment, the laser 230 may provide approximately 100 milliwatts of optical output.

As will be described in more detail below with respect to FIG. 4, in one embodiment, the rotating beam modification element 240 includes a diffuser portion and a relatively smaller deflector portion. In operation, the motor power and control line 237 controls the beam modification element motor 235 to rotate the beam modification element 240. During most of the rotation of the beam modification element 240, the beam from the laser passes through the diffuser portion to be output from the beam modification element 240 along a first beam path as a diffuse laser beam 231 which provides relatively diffuse illumination that is used for structured light measurement operations over a relatively narrow measurement range along a "Z-probe" measurement direction relative to the probe. However, when the deflector portion is in front of the laser 230, the laser beam passes through the deflector portion to be output from the beam modification element 240 along a second beam path as a concentrated laser beam 231' which provides relatively concentrated illumination that is used for measurement ("range finding") and/or collision detection over a relatively large range along the Z-probe direction. The paths of each of the laser beams 231 and 231', as well as range finding operations, will be discussed in more detail below.

Regarding typical structured light measurement operations, the diffuser portion of the beam modification element 240 is located front of the laser 230, and the diffuse laser beam 231 is output from the diffuser portion toward the deflecting mirror 232. The laser beam may be approximately collimated prior to entering the rotating beam modification element 240. The diffuser portion of the beam modification element 240 is used to eliminate speckle from structured light workpiece images captured by the camera 270 during typical workpiece measurement operations. In one example embodiment, the diffuser portion may provide an effective numerical aperture (NA) of a selected value (e.g. NA=0.5.) The diffuser portion of the rotating beam modification element 240 outputs the laser beam 231 as diffuse light that diverges according to the provided NA, and that reflects from the mirror 232 to enter the illumination optics 273. The illumination optics 273 may approximately collimate the diffuse light and transmit it through the spatial light modulator 250. The light from the spatial light modulator 250 generally includes a structured light pattern that is projected (i.e. imaged) by the projection optics 255 onto a workpiece surface proximate to a nominal projection pattern plane 262. In one embodiment, the illumination optics 273 are designed to provide Koehler illumination, which may not be fully collimated when passing through the spatial light modulator 250, but may be sufficiently collimated for proper structured light illumination of a workpiece. In one embodiment, a first lens of the projection optics 255 may bring the structured light illumination from the spatial light modulator 250 to a focus point at the aperture 260, which may be used to control the depth of field of the structured light pattern image at the nominal projection pattern plane 262. In one embodiment, the spatial light modulator 250 may be a commercially available spatial light modulator such as the Sony LCX017AL, available through Sony Corporation of America, New York, N.Y.

The interface electronics 290 may receive input signals including an analog video control signal and other signals (as described in more detail below). The probe control interface electronics 290 may include a commercially available compatible chip set (e.g. such as is available from Sony Electronics) for converting the analog video control signal into digital control signals that configure the spatial light modulator 250 to display the proper pixel pattern. Then, the pattern is projected from the spatial light modulator 250 by the projection optics 255. The aperture 260 is an aperture stop that may be sized to provide acceptable image spatial resolution, minimize image aberrations, and provide acceptable energy throughput for the optics 255. It may also govern the depth of field of the projected image of the structured light pattern proximate to the nominal projection pattern plane 262, which is also the nominal focal plane of the camera optics 265. The depth of field may be approximately the same as the structured light measurement range R1, illustrated in FIG. 3. In one embodiment, the depth of field of both the projected structured light image and the camera optics 265 is approximately plus or minus six millimeters.

The angle of the camera optics 265 relative to the nominal projection axis of the structured light pattern provides a triangulation angle that provides Z-height information as the structured light image on a workpiece surface is mapped onto the imaging surface of the camera 270. The image from the camera 270 can be analyzed using known triangulation methods. In one embodiment, the camera 270 has control electronics that could either be in the electronics 290 or in the camera 270 itself (which can be an integrated camera system that has its own control circuits and/or software). The camera 270 may generally include certain timing functions, etc. which control integration time, sequence of operations, etc. The camera trigger and control line 275a (which in some embodiments may comprise multiple wires), triggers the camera 270 to perform selected functions, and also may send more control signals that specifically control the integration time, etc. The power line 275b provides power to the camera 270. As shown, the analog video out line 275c includes a dashed line portion that indicates that the image data output from the camera 270 may bypass the rest of the electronics 290 and be routed directly to an external processing device (e.g. a frame grabber included in the non-contact probe controller 170), in that the output of the camera 270 may not need to be operated on by the probe control interface electronics 290.

To briefly summarize the structured light measurement principles, the structured light probe 110' utilizes the laser 230 and spatial light modulator 250 to project a structured light pattern (e.g. stripes) that covers a patch of the workpiece surface. From the view of the camera 270, each of the stripes that is projected across the surface of the workpiece will have offset portions that are indicative of the Z-height of the surface of the illuminated features on the workpiece. The Z-heights of the offset portions can be calculated in accordance with a triangulation formula, as determined in part by the angular orientation and distance of the camera 270 from the nominal projection pattern plane 262. The information from each of the contour stripes can then be recombined to produce a 3-D surface map for the measured surface of the workpiece. Various components, control signal techniques, and signal processing techniques, usable to provide the foregoing probe control and measurement operations as well as other operations in accordance with this invention are described in more detail in U.S. patent application Publication No. 2008-0024793-A1 titled "Non-contact Probe Control Interface", which is hereby incorporated by reference in its entirety.

Regarding typical range finding operations, the deflector portion of the beam modification element 240 is located front of the laser 230, and the concentrated laser beam 231' is output from the deflector portion toward the deflecting mirror 232'. The laser beam may be approximately collimated prior to entering the deflector portion, and may therefore be approximately unmodified except for following a deflected path, in various embodiments. The concentrated laser beam 231' is reflected by the mirror 232' down to the field of view of the camera 270, where it may produce a spot of concentrated illumination on a workpiece surface, which it is imaged by the camera 270 to provide a range finding image. The range finding image may be acquired and output as previously outlined with respect to structured light measurement images. It should be appreciated that because the concentrated laser beam 231' provides a concentrated spot image, a range finding image may be acquired from a surface that is far outside the depth of field of the camera optics 265. In such a case, the spot in the range finding image may be out of focus, but its nominal "center location" in the image may still be analyzed (e.g. by finding the centroid of the spot using known image processing methods) to provide a relatively accurate range measurement. Additional considerations related to range finding and related operations are described in more detail below.

Figure 3:
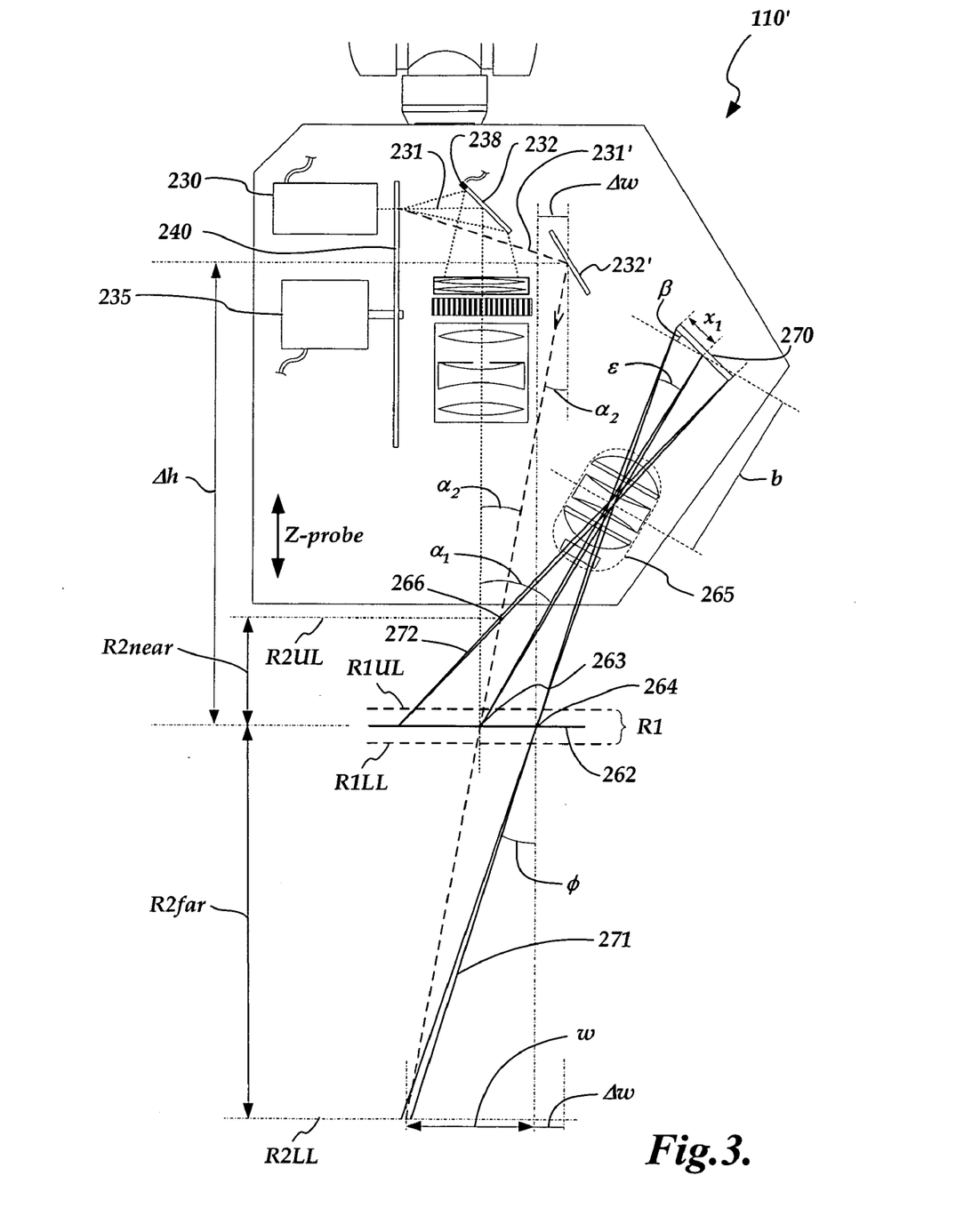
FIG. 3 is a diagram illustrating the layout of the structured light probe measurement probe of FIG. 2.

Structured light image acquisition should be synchronized with the presence of the relatively diffuse laser beam 231 provided by the diffuser portion of beam modification element 240, and range finding image acquisition should be synchronized with the presence of the relatively concentrated laser beam 231' provided by the deflector portion of beam modification element 240. The probe embodiment shown in FIGS. 2 and 3 includes the photodetector 236 that may output a synchronization signal to the electronics 290 over the photodetector power and signal line 238. As illustrated in FIGS. 2 and 3, the photodetector may be positioned to receive a portion of the diffuse laser beam 231 that is not needed for providing the structured light pattern, and will output a high valued signal when the diffuse laser beam 231 is present. When the concentrated laser beam 231' is present, the photodetector 236 will output a low valued signal. The transitions of the signal output from the photodetector 236 may be used by the electronics 290 to provide reference times and/or trigger signals for synchronizing various imaging operations. They may also be used as feedback signals for controlling the speed of the beam modification element motor 235, in various embodiments.

FIG. 3 is a diagram illustrating aspects of the configuration of the probe 110' and the utilization of the beam 231' for a providing range finding function. As shown in FIG. 3, the approximate center of the camera 270 may be located at a distance b from the nominal plane of the camera optics 265, and the camera may be rotated by an angle β relative to a plane normal to optical axis of the camera optics 265. In various embodiments, the angle β may be selected to provide a Scheimpflug configuration with respect to the nominal projection plane 262, which is also the nominal object plane for acquiring structured light images. The dimension from the center of the camera to the edge of its imaging array may be approximately $x_1$. Accordingly, the angle ε between the optical axis and the outermost ray 271 (shown near the bottom of FIG. 3) which may be included in an image is approximately $$\varepsilon = \arctan\left(\frac{x1\cos(\beta)}{b}\right) \quad \text{(Eq. 1)}$$

The optical axis of the camera optics 265 is shown to be at an angle α1 with respect to the optical axis the diffuse laser beam 231, which in this case is same as the nominal projection axis for the structured light patterns and the Z-probe direction. A central point 263, where the optical axis of the camera optics 265 intersects the plane 262 is a primary reference point that is fixed at a given distance along the optical axis from the nominal plane of the camera optics 265 for a given design. Accordingly, a point 264 where the outermost ray 271 intersects with the plane 262 may be determined relative to the elements of the probe 110'.

All of the foregoing geometric factors may be primarily dictated by design considerations related to the structured light imaging functions of the probe, to support its primary, and most accurate, measuring mode. They are hereafter to considered to be fixed by design, in the following description of one exemplary method of designing the probe 110' to provide a desired range finding range "R2far".

One aspect of the design of the probe 110' that is relatively flexible is the placement and angle of the deflection mirror 232'. As illustrated in FIG. 3, the deflection point of the relatively concentrated laser beam 231' on the mirror 232' is offset from the known point 264 (where the outermost imaging ray 271 intersects with the nominal plane 262) by a dimension $\Delta w$ perpendicular to the structured light projection direction (the Z-probe direction) and by a dimension $\Delta h$ parallel to the Z-probe direction. The angle $\alpha 2$ is shown to be the angle between the projection direction of the relatively concentrated laser beam 231' and the Z-probe direction. It may be seen in FIG. 3 that in order to provide a range finding range of R2far, a spot imaged on a surface at the lower limit R2LL of the range R2far must be located at, or to the left of, a distance w along a direction perpendicular to the Z-probe direction from the known point 264. By observation:

$$w = (R2\text{far}) \tan \phi \quad \text{(Eq. 2)}$$

$$w + \Delta w = (R2\text{far} + \Delta h) * \tan(\alpha 2) \quad \text{(Eq. 3)}$$

where the angle $\phi = (\alpha 1 - \epsilon)$.

From EQUATIONS 2 and 3, in order for the range finding spot to be imaged at the surface R2LL, for a desired range finding range R2far, the mirror 232' should be located and oriented such that $\Delta w$, $\Delta h$ and $\alpha 2$ meet the condition that:

$$[(R2\text{far} + \Delta h) * \tan(\alpha 2)] - \Delta w \geq R2\text{far} \tan(\phi) \quad \text{(Eq. 4)}$$

In one example, desirable structured light imaging specifications are provided by the design values $\alpha 1 = 35°$, $\beta = 19°$, $x_1 = 5$ mm, $b = 60$ mm, therefore $\epsilon = 4.5°$ and $\phi = 30.5°$. A desirable range finding range beyond the nominal plane 262 may be selected as R2far=100 mm. A typical size for the probe 110" may be on the order of 100 mm in height and width. Therefore, for a probe component layout approximately as illustrated in FIG. 3, in one example, it may be reasonable to position the mirror 232' such that $\Delta w = 10$ mm and $\Delta h = 110$ mm. Accordingly, from EQUATION 4 and the foregoing values, if the mirror 232' is angled to provide $\alpha 2 = 18.2°$, then a range finding range corresponding to approximately R2far=100 mm will be provided.

It should be appreciated that the foregoing design values are exemplary only, and not limiting. Numerous other configurations are possible. It should also be appreciated that the foregoing analysis includes various simplifications for the sake of clarity. For example, the image of the range finding spot on a surface at R2LL will be significantly blurred, and part of that blurred spot may extend outside of the imaging area of the camera 270. Therefore, it may not be possible to accurately locate the center of the spot by image processing techniques. Accordingly, the practical range finding range of the probe 110' may be somewhat less than that indicated above. The practical range finding range for a particular probe design according to this invention may be confirmed by more comprehensive analysis and/or experiment.

Regarding a range finding range R2near shown in FIG. 3, it may be seen in FIG. 3 that the total range finding range of the probe 110' is actually R2=R2far+R2near, where R2near corresponds to the intersection of the path of the relatively concentrated laser beam 231' with the other "outermost" imaging ray 272 at the point 266. Generally, R2near is not a critical design parameter, in that positioning the probe 110' closer to a workpiece than the structured light imaging range R1 may introduce a risk of collision, and is avoided in many applications. Therefore, the range finding range R2near it is not discussed in detail here. However, more generally, it will be appreciated that the range R2near may be a usable range finding range in various applications, and in particular, when the structured light measurement range R1 is located relatively far from the probe 110'. In such cases, the range R2near may be determined according to geometric principles analogous to those outlined above with reference to the range R2far, if desired.

As previously indicated, the concentrated laser beam 231' may provide a concentrated illumination spot on a surface, for example on the order of 750 microns in diameter in various embodiments. A range finding image including a blurred image of the spot may be acquired from a surface that is far outside the depth of field of the camera optics 265 (that is, outside the range R1). The centroid of a blurred spot in a range finding image may still typically be determined within several pixels, or a few pixels, or less, to provide useful range measurement over a large range. In various applications, such a range measurement may be used for approximate dimensional measurements, or as a feedback signal that may be used to guide the probe 100' to position a workpiece surface within the nominal structured light measuring range R1, or as a measurement that may be provided and analyzed at a relatively high rate in order to anticipate and prevent probe collisions with unexpected workpiece features or other obstacles. It should be appreciated that the position of the range finding spot image on the camera will not generally be linearly related to the position coordinate of corresponding surface along the Z-probe direction. However, the relationship between the range finding spot image location and the surface coordinate along the Z-probe direction may be determined by comprehensive analysis and/or experiment, and stored as a lookup table, or a calibration curve expression, or the like.

Figure 4:
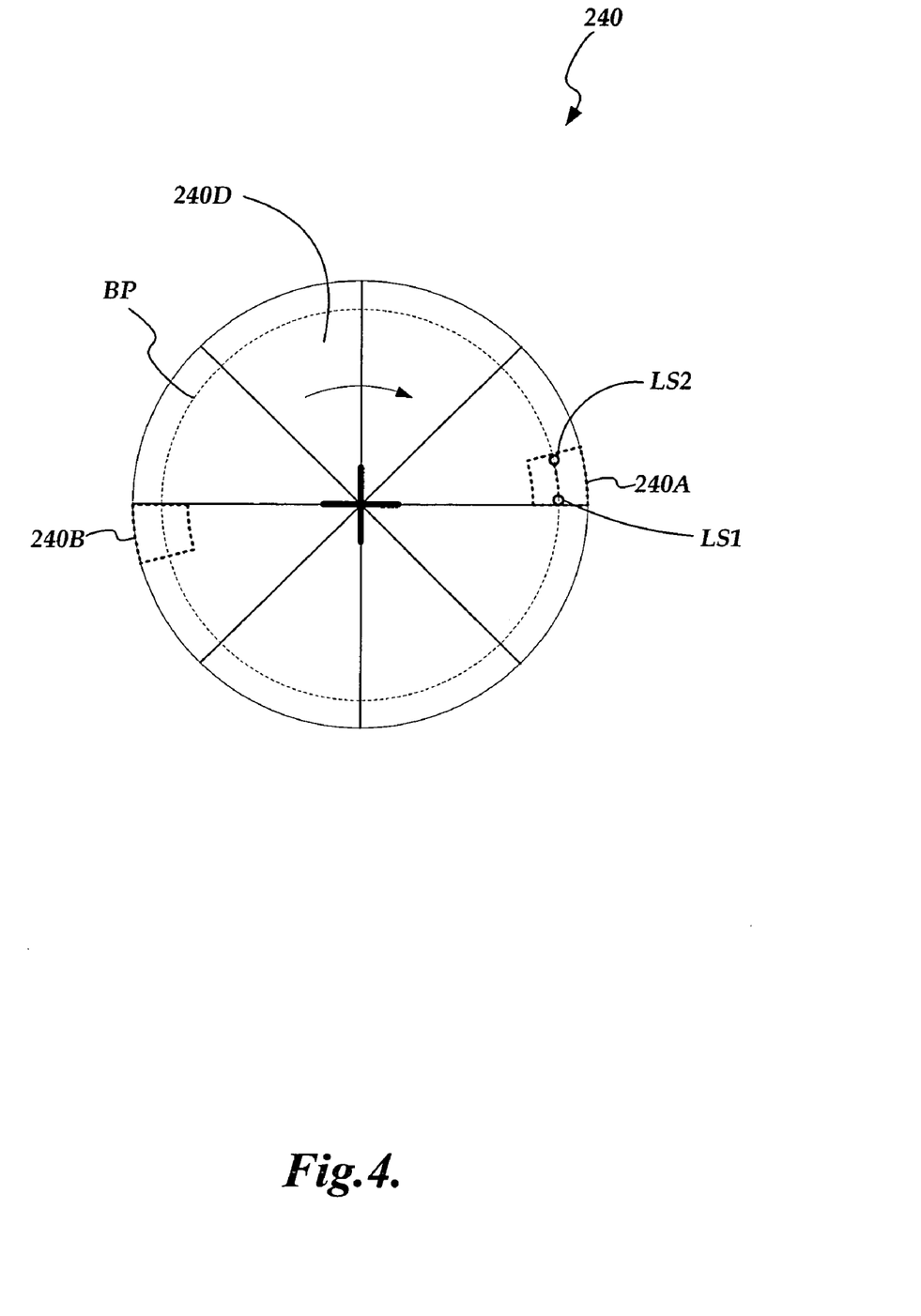
FIG. 4 is a diagram of a rotating beam modification element of the measurement probe of FIGS. 2 and 3.

FIG. 4 is a diagram of one embodiment of a rotating beam modification element 240 including a first deflector portion 240A and an optional second deflector portion 240B that may provide the deflected relatively concentrated laser beam 231' as shown in FIGS. 2 and 3. The remainder of the beam modification element 240 may include a diffuser portion 240D that may provide the diverging relatively diffuse laser beam 231 as shown in FIGS. 2 and 3. In one embodiment, it is desirable for the deflector portions 240A and 240B of the rotating beam modification element to be of a light weight, or dynamically balanced, so that the element 240 is suitable for high speed rotation.

As previously indicated the purpose of the diffuser portion 240D is to partially diffuse laser illumination that may be used to eliminate speckle from the structured light workpiece images captured by the camera 270. In addition, in one embodiment the diffuser portion 240D may provide an approximate numerical aperture (NA) of a selected value (e.g. NA=0.5) to provide diverging illumination that subsequently illuminates most or all of the area of the spatial light modulator 250. Various techniques for fabricating and using rotating diffusers in this manner are disclosed in US Patent Publication No. 2005/0207160A1, and U.S. Pat. Nos. 6,081,381, and 6,643,024, each of which is incorporated in herein by reference in their entirety. The deflector portions 240A and 240B may be manufactured as part of the rotating beam modification element 240 (e.g. by known diffractive optical element manufacturing techniques or micro-molding or the like), or may otherwise be added to it (e.g. as miniature prisms or the like) with adhesive or by other manufacturing process. Commercial optics vendors such as Physical Optics Corporation (POC) of Torrance, Calif., may provide products and/or services are suitable for fabricating various embodiments of the rotating beam modification element 240 shown in FIG. 4, as well as variations thereof.

The rotating beam modification element 240 is illustrated with a beam path BP which is nominally the path that the input beam from the laser 230 traces along the rotating beam modification element 240 during operation. In one embodiment, the beam path BP may have a radius of approximately 13 millimeters and the element 240 may have a radius of approximately 15-17 millimeters. In one embodiment, each of the deflector portions 240A and 240B covers approximately 15 degrees of rotation. However, as indicated by the laser beam input spots LS1 and LS2 illustrated adjacent to the leading and trailing edges of the deflector portion 240A, due to the need to have the entire laser beam positioned within the deflector portion for accurate operation, their operational angular range is somewhat less (e.g., on the order of 12 degrees).

As will be described in more detail below, as the beam modification element 240 is rotated, the time it takes for the laser to move between the laser spot LS1 and the laser spot LS2 determines the amount of time that the laser beam is deflected by the deflector portion 240A to provide a relatively concentrated laser beam 231' that is suitable for illuminating range finding images. In various embodiments, the camera 270 is able to provide output images at approximately a 33 Hz frame rate. Thus, in one exemplary embodiment, the beam modification element 240 may be rotated at approximately 3600 rpm (=1 Hz), and the deflector portion 240A is usable to provide a 12 degree rotation range that will provide approximately 1/30 of a second of range finding illumination, which is sufficient for exposing one range finding image at a 33 Hz frame rate. If the optional deflector portion 240B is included, range finding measurements can be provided at a rate of 2 Hz. The diffuser portion 240D can then provide the relatively diffuse illumination 231 for up to approximately 30 structured light images per second, assuming that a structured light image can be sufficiently exposed during the corresponding image integration period.

It should be appreciated that if a range finding spot image would be over-exposed by providing the spot illumination during the entire camera integration period, then the laser beam can be turned on and off in a strobe-like fashion as it passes through the deflector portion, in order to control the range-finding image exposure time, and the deflector portion(s) can cover less angular range in that case. More generally, in order to ensure proper exposure of either range finding images, or structured light images, various factors can be adjusted, including the rotation speed of the element 240, the laser power and/or laser on/off timing, the camera integration period, etc. In one embodiment, the control of the laser may be synchronized with the integration time of the camera, such that if a structured light image requires a very long integration time, the laser is turned off at any time during the exposure when it would otherwise pass through a deflector portion. Thus, only the structured light illumination is provided throughout the entire image exposure, as desired.

Figure 5:
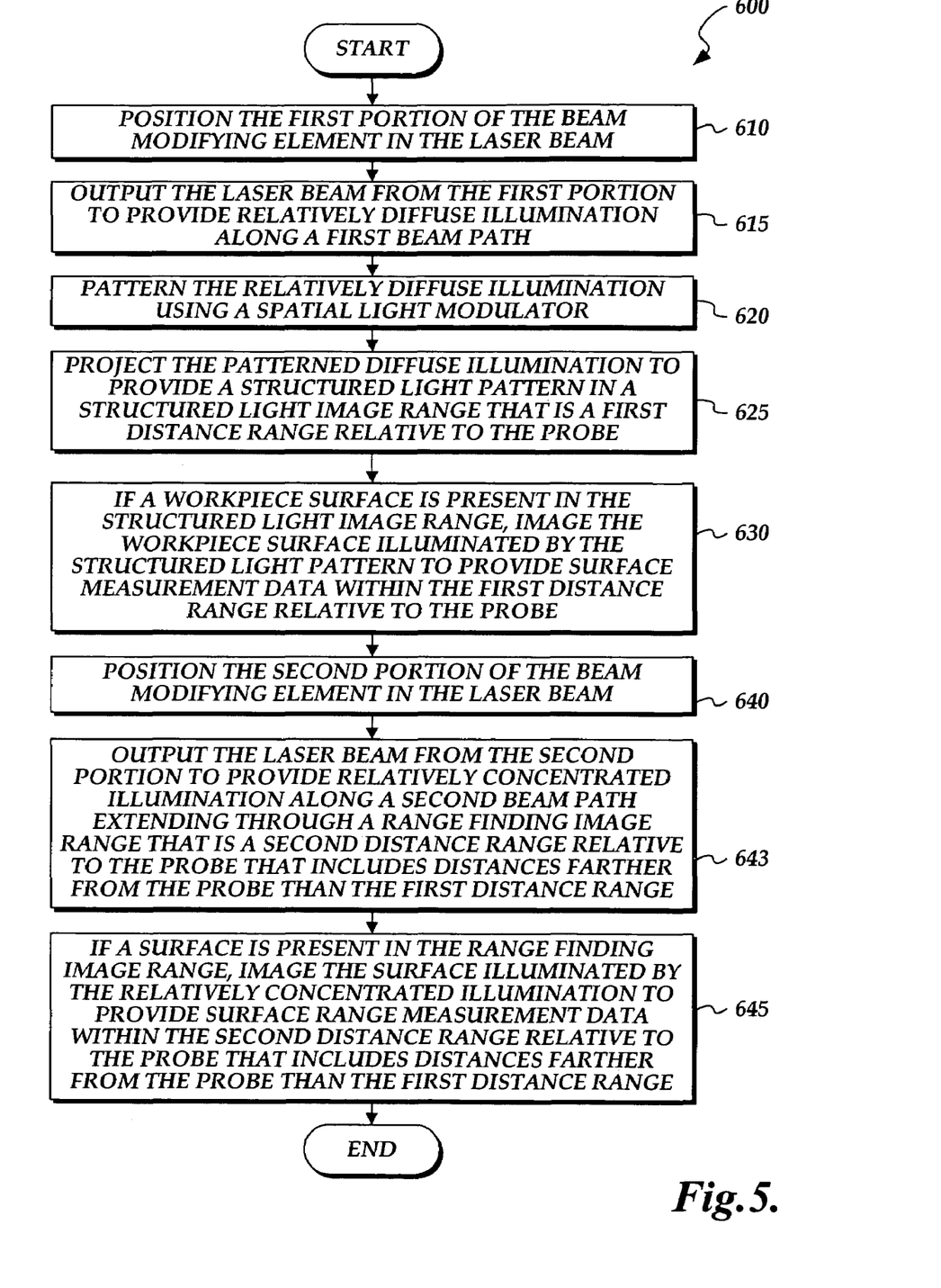
FIG. 5 is a flow diagram illustrating a routine for the operation of a multi-range structured light probe according to this invention.

FIG. 5 is a flow diagram illustrating one exemplary routine 600 for the operation of a multi-range structured light probe according to this invention. As shown in FIG. 5, at block 610, a first portion of a beam modifying element is positioned in the laser beam. This corresponds to the diffuser portion of the beam modification element being positioned in the path of the beam from the laser while the beam modification element is rotating. At a block 615, the laser beam is output from the first portion and continues on as relatively diffuse illumination along a first beam path. In other words, in one embodiment, after the laser beam passes through the diffuser portion of the beam modification element, the beam is partially diffuse so that it may be used to suppress speckles when providing illumination for a structured light image. In various embodiments, the first portion may also cause the partially diffuse illumination to diverge approximately according to a prescribed numerical aperture. In one embodiment the first beam path may include one or more deflecting mirrors. At a block 620, the relatively (partially) diffuse laser beam illumination is patterned by a spatial light modulator positioned along the first beam path. At a block 625, the patterned diffuse illumination is projected to provide a structured light pattern to a structured light image range (e.g. the structured light image range R1 shown in FIG. 3) that is a first distance range relative to the probe. At a block 630, if a workpiece surface is present in the structured light image range, an image is taken of the structured light pattern on the workpiece surface to provide surface measurement data within the first distance range relative to the probe. In other words, from the view of a triangulation image taken by the probe camera, the structured light pattern (e.g. light stripes) form contours that depend on the height of each portion of the workpiece surface. The resulting data may be analyzed to determine an accurate 3-D surface map of the workpiece within the first distance range (e.g., within the depth of field of the camera optics and the structured light projection optics) relative to the probe.

The routine then continues to a block 640, where a second portion of the beam modifying element is positioned in the laser beam. In one embodiment, this corresponds to a beam deflecting portion of the beam modification element being positioned in the path of the beam from the laser while the beam modification element is rotating. At a block 643, the laser beam is output from the second portion and continues on as relatively concentrated illumination along a second beam path extending through a range finding image range that is a second distance range relative to the probe. In other words, in one embodiment, the laser beam is a compact relatively concentrated beam (e.g. a collimated concentrated beam), which passes through the deflecting portion of the beam modification element and remains a concentrated beam that is deflected along the second beam path by the deflecting portion, to provide a region of concentrated illumination (e.g. a spot) in range finding images. In one embodiment the second beam path may include one or more deflecting mirrors. At a block 645, if a workpiece surface is present in the range finding image range, an image is taken of the compact illuminated region on the workpiece surface to provide surface measurement data within the second distance range relative to the probe. The second distance range relative to the probe includes distances farther from the probe than the first distance range. In other words, from the view of a triangulation image taken by the probe camera, the location of the deflected concentrated laser beam in the image depends on the height of the workpiece surface portion that it illuminates. The resulting image data allows the distance of the workpiece surface from the probe to be approximately determined over a range finding image range that extends significantly beyond the structured light imaging range. Thus, a probe configured according to this invention may provide multiple types of triangulation measurement over multiple measurement ranges in a simple, fast, and versatile manner, using few parts.

As previously indicated, various components, control signal techniques, and signal processing techniques, usable to provide the foregoing probe control and measurement operations as well as other operations in accordance with this invention are described in more detail in the previously incorporated U.S. patent application Publication No. 2008-0024793-A1 titled "Non-contact Probe Control Interface". Range finding image acquisition according to this invention is easily integrated with the methods described therein. For example, in one simple embodiment, the non-contact probe controller 170 and/or the computer and user interface 160 may simply periodically send a set of probe component control signals that are appropriate for acquiring a range finding image to the probe control interface electronics 290. This may be done using the same methods described therein for sending the various structured light image probe component control signals to the probe. In one such embodiment, the probe control interface electronics 290 may include a simple "inhibitory" logic circuit or routine that is enabled by a code or signal included in the periodically sent set of range finding image control signals. When such a signal is received in the probe control interface electronics 290, the inhibitory logic circuits may inhibit the camera trigger signal, for example, unless or until they receive a "diffuse illumination absent" synchronization signal that is derived from the output of the photodetector 236, described previously. Thus, it may be insured that the range finding image is acquired when the relatively concentrated illumination is present along its corresponding optical path.

Similarly, the probe control interface electronics 290 may include other "inhibitory" logic circuits or routines that are enabled by a code or signal included in the structured light image control signals. When such a signal is received in the probe control interface electronics 290, the related inhibitory logic circuits may inhibit the camera trigger signal, unless or until they receive a "diffuse illumination present" synchronization signal that is derived from the output of the photodetector 236. Thus, it may be insured that a structured light image is acquired when the structured light illumination is present along its corresponding optical path. Various other control and synchronization methods will be apparent to one skilled in the art based on the foregoing disclosure.

Numerous variations in the illustrated and described arrangements of features and sequences of operations will be apparent to one skilled in the art based on this disclosure. For example, in some embodiment the portion of the beam modifying element that outputs the relatively concentrated laser beam may be configured to output a stripe, or three spots in a known relationship, etc. Thus, approximate range measurements may be determined for a limited number of spots on a surface, for example to determine an approximate surface orientation, or the like. Furthermore, although the foregoing embodiments have described the deflected beam as the relatively concentrated beam, it should be appreciated that in some embodiments a beam modification element and probe layout may be configured such that the relatively concentrated beam is not deflected by the beam modification element, and the diverging partially diffuse beam is the beam that is deflected to an appropriate optical path. In such an embodiment, the portion of the beam modification element that outputs the relatively concentrated beam may comprise a simple transparent portion, or an open portion (e.g. a hole through the beam modification element), or the like. Furthermore, in some embodiments, an appropriately configured "linear" beam modifying element could be used in conjunction with a linear reciprocating motion, as an alternative to the rotational beam modifying element described herein. Thus, while the preferred embodiment of the invention has been illustrated and described, it will be appreciated that various changes can be made therein without departing from the spirit and scope of the invention.

The invention claimed is:

1. A measuring probe for measuring the dimensions of a workpiece, the probe comprising:
   at least one camera;
   a structured light projection portion;
   a beam producing element that produces a light beam;
   a beam modifying element comprising a first portion and a second portion, and
   a beam modifying element mover arranged to move the beam modifying element such that the light beam may be input to the first and second portions;
   wherein:
   the beam modifying element mover is operable to position the first portion of the beam modifying element to input the light beam during a first time period;
   during the first time period the light beam is output from the first portion as diffused illumination along a first beam path, is patterned by the structured light projection portion, and is projected as a structured light pattern in a structured light image range that is a first distance range relative to the measuring probe;
   the beam modifying element mover is operable to position the second portion of the beam modifying element to input the light beam during a second time period;
   during the second time period the light beam is output from the second portion as concentrated illumination along a second beam path that extends through a range finding image range that is a second distance range relative to the measuring probe;
   during the first time period at least one camera is operable to image the structured light pattern on a workpiece surface in the structured light image range to provide surface measurement data within the first distance range relative to the probe; and
   during the second time period at least one camera is operable to image the concentrated illumination on a surface in the range finding image range to provide surface measurement data within the second distance range relative to the probe, wherein the second distance range includes distances farther from the probe than the first distance range.

2. The probe of claim 1, wherein the first portion comprises a diffuser portion that outputs a partially diffuse illumination.

3. The probe of claim 2, wherein the first portion outputs diverging partially diffuse illumination.

4. The probe of claim 2, wherein the second portion comprises a deflector portion.

5. The probe of claim 4, wherein the beam modifying element comprises a rotating beam modifying element and the deflector portion covers an angular range of at most 30 degrees around a nominal beam path of the rotating beam modifying element.

6. The probe of claim 4, wherein the beam modifying element comprises a rotating beam modifying element and the deflecter portion covers an angular range of at most 15 degrees around a nominal beam path of the rotating beam modifying element.

7. The probe of claim 1, wherein the at least one camera consists of a single camera and the at least one camera that is operable to image the structured light pattern on a workpiece surface in the structured light image range and the at least one camera that is operable to image the concentrated illumination on a surface in the range finding image range are the same camera.

8. The probe of claim 1, wherein the image of the concentrated illumination on a surface in the range finding image range comprises a blurred spot.

9. The probe of claim 8, wherein the location of the blurred spot in the image is analyzed in a coordinate measurement system to determine an approximate position of the illuminated portion of the surface within the second distance range relative to the probe.

10. The probe of claim 1, wherein the structured light image range spans at most 10 mm, and the range finding image range spans at most 50 mm.

11. The probe of claim 10, wherein the at least one camera consists of a single camera and the at least one camera that is operable to image the structured light pattern on a workpiece surface in the structured light image range and the at least one camera that is operable to image the concentrated illumination on a surface in the range finding image range are the same camera.

12. The probe of claim 10, wherein the range finding image range spans at least 75 mm and includes the structured light image range.

13. The probe of claim 12, wherein the second distance range includes distances that are at least 75 mm farther from the probe than the largest distance from the probe that is included in the first distance range.

14. The probe of claim 1, wherein the probe includes at least one reflective surface located along at least one of the first and second beam paths, and the probe is configured such that the structured light pattern is projected from the probe at a first angle relative to an optical axis of an optical system of a camera, and the concentrated illumination is projected from the probe at a second angle relative to the optical axis of that optical system.

15. The probe of claim 14, wherein the second angle is less than the first angle.

16. The probe of claim 1, wherein the probe comprises a coordinate measurement machine autojoint connection and all insulated conductor power, ground and signal connections to and from the measuring probe are made through connector pins included in the coordinate measurement machine autojoint connection.

17. The probe of claim 16, wherein the coordinate measurement machine autojoint connection is in a standard configuration for Renishaw™ type machines.

18. The probe of claim 16, wherein the probe comprises a probe interface circuit, and the structured light projection portion comprises a controllable array-type spatial light modulator.

19. The probe of claim 1, wherein the beam producing element comprises a semiconductor laser.

20. A method for operating a measuring probe comprising a camera, a structured light projection portion, a beam producing element that produces a light beam, a beam modifying element comprising a first portion and a second portion, and a beam modifying element mover arranged to move the beam modifying element such that the light beam may be input to the first and second portions, the method comprising:
  operating the beam modifying element mover to position the first portion of the beam modifying element to input the light beam during a first time period;
  during the first time period, outputting the light beam from the first portion as diffused illumination along a first beam path, patterning that diffused illumination using structured light projection portion, and projecting the patterned diffused illumination as a structured light pattern in a structured light image range that is a first distance range relative to the measuring probe;
  operating the beam modifying element mover to position the second portion of the beam modifying element to input the light beam during a second time period;
  during the second time period, outputting the light beam from the second portion as concentrated illumination along a second beam path that extends through a range finding image range that is a second distance range relative to the measuring probe;
  during the first time period, when a workpiece surface is present in the structured light image range, operating the camera to image the structured light pattern on the workpiece surface in the structured light image range to provide surface measurement data within the first distance range relative to the probe; and
  during the second time period, when a surface is present in the range finding image range, operating the camera to image the concentrated illumination on the surface in the range finding image range to provide surface measurement data within the second distance range relative to the probe, wherein the second distance range includes distances farther from the probe than the first distance range.

* * * * *

UNITED STATES PATENT AND TRADEMARK OFFICE
CERTIFICATE OF CORRECTION

| | |
|---|---|
| PATENT NO. | : 7,508,529 B2 |
| APPLICATION NO. | : 11/497466 |
| DATED | : March 24, 2009 |
| INVENTOR(S) | : P. Gladnick et al. |

Page 1 of 1

It is certified that error appears in the above-identified patent and that said Letters Patent is hereby corrected as shown below:

| COLUMN | LINE | ERROR |
|---|---|---|
| (57)<br>Pg. 1, col. 2 | Abstract<br>10 of text | "for a second time period range" should read --for a second time period for providing range-- |
| 12<br>(Claim 6, | 61<br>line 3) | "deflecter" should read --deflector-- |
| 12<br>(Claim 7, | 65<br>line 2) | "camera and" should read --camera, and-- |
| 13<br>(Claim 10, | 14<br>line 3) | "most 50" should read --least 50-- |
| 13<br>(Claim 11, | 16<br>line 2) | "camera and" should read --camera, and-- |
| 14<br>(Claim 20, | 20<br>line 14) | "structured light projection portion," should read --the structured light projection portion,-- |

Signed and Sealed this

Sixteenth Day of March, 2010

David J. Kappos
*Director of the United States Patent and Trademark Office*